(12) United States Patent
Ueshima

(10) Patent No.: US 7,371,164 B2
(45) Date of Patent: May 13, 2008

(54) BOXING GAME SYSTEM

(75) Inventor: Hiromu Ueshima, Shiga (JP)

(73) Assignee: SSD Company Limited, Kusatsu (JP)

( * ) Notice: Subject to any disclaimer, the term of this patent is extended or adjusted under 35 U.S.C. 154(b) by 716 days.

(21) Appl. No.: 10/493,302

(22) PCT Filed: Jul. 9, 2003

(86) PCT No.: PCT/JP03/08742

§ 371 (c)(1),
(2), (4) Date: Apr. 30, 2004

(87) PCT Pub. No.: WO2004/009196

PCT Pub. Date: Jan. 29, 2004

(65) Prior Publication Data

US 2005/0014542 A1   Jan. 20, 2005

(30) Foreign Application Priority Data

Jul. 18, 2002   (JP) ............................. 2002-209201

(51) Int. Cl.
*A63F 13/00* (2006.01)
(52) U.S. Cl. ........................................................ 463/8
(58) Field of Classification Search .................... None
See application file for complete search history.

(56) References Cited

U.S. PATENT DOCUMENTS 4,491,324 A * 1/1985 Yoshida .......................... 463/8

FOREIGN PATENT DOCUMENTS

| JP | 60-168475 A | 8/1985 |
|---|---|---|
| JP | 8-10446 | 1/1996 |
| JP | 9-285581 A | 11/1997 |
| JP | 2002-007057 A | 1/2002 |
| JP | 2002-153673 A | 5/2002 |
| JP | 2002-200339 A | 7/2002 |

OTHER PUBLICATIONS

Machine translation of JP2002-200339 obtained from JPO website.*
Machine translation of JP2002-007057 obtained form JPO website.*

* cited by examiner

*Primary Examiner*—M. A Sager
(74) *Attorney, Agent, or Firm*—Arent Fox LLP.

(57) ABSTRACT

A boxing game system (10) includes a game machine (12) and a globe-type inputting apparatus (34). A game player holds a main body (40) of the inputting apparatus, and swings the inputting apparatus in such a manner as to actually play boxing. A piezoelectric buzzer is provided within the main body, and the piezoelectric buzzer detects an acceleration at a time of swinging the inputting apparatus. Acceleration information is transmitted by an infrared light, and the infrared light is received and demodulated by an infrared light light-receiving demodulating portion (32). Upon receipt of the demodulated acceleration information, a game processor calculates an intensity of a punch at a time of swinging the inputting apparatus. A damage value is determined by the intensity of the punch, and according to the damage value, a stamina value of a boxer displayed on a monitor (20) is calculated. When the stamina value runs out, the boxer is knocked down.

6 Claims, 17 Drawing Sheets

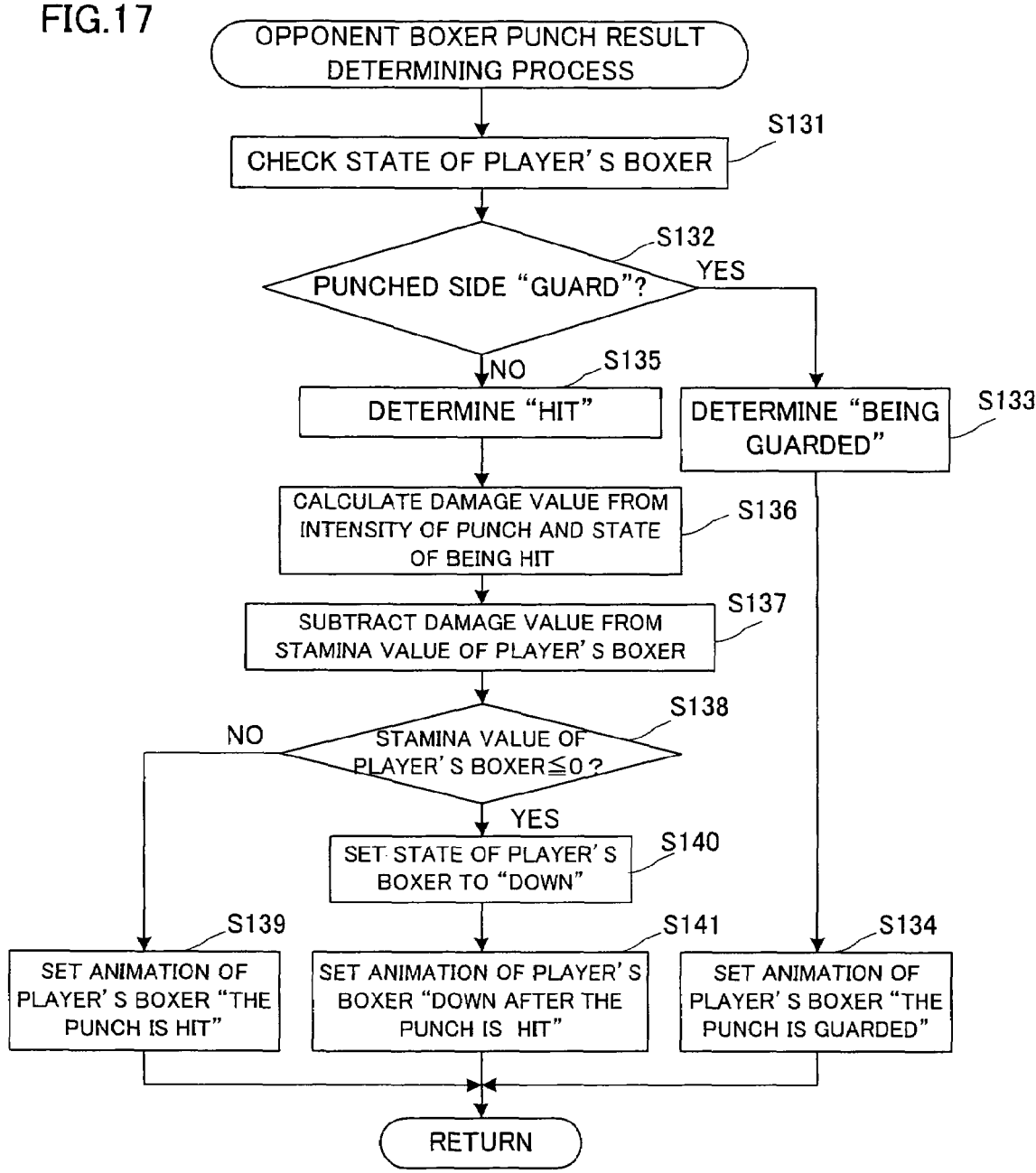

BOXING GAME SYSTEM

CROSS-REFERENCE TO RELATED APPLICATION

This application is a National Stage entry of International Application No. PCT/JP2003/008742, filed Jul. 9, 2003, the entire specification claims and drawings of which are incorporated herewith by reference.

TECHNICAL FIELD

The present invention relates to a boxing game system. More specifically, the present invention relates to a novel sensory boxing game system in which a globe-type inputting apparatus is attached to a hand, and by operating the inputting apparatus as if to actually play boxing in a real space, boxing is played against an opponent boxer displayed on a monitor screen.

PRIOR ART

In the past, there are a number of home-use television games and arcade video games using boxing as a theme.

The home-use television game is a television game in which, by operating a controller of a game machine by a finger, a player operates a character (boxer) in a screen. This lacks a real sensation or feeling of playing boxing.

On the contrary, there is an arcade boxing game machine that by a retractable handle provided in the game machine, a kind and an intensity of a punch is input. It is possible to give the real sensation or feeling of boxing to the player in such the arcade game machine, and however, the game machine needs to be large in size due to mechanism, thus not possible to be used as the home-use game machine.

SUMMARY OF THE INVENTION

Therefore, it is a primary object of the present invention to provide a novel sensory boxing game system.

It is another object of the present invention to provide a home-use sensory boxing game system capable of playing a game while experiencing a real sensation of boxing.

A boxing game system according to the present invention is a boxing game system, and comprises: an inputting apparatus swung in a real space, which is held by a hand of a game player, or attached to the hand of the game player, including an acceleration sensor for detecting a magnitude of a swing of the inputting apparatus, and a wireless transmitting means for transmitting in a wireless manner acceleration information detected by the acceleration sensor; a wireless receiving means for receiving the acceleration information transmitted by the wireless transmitting means; and a game processor for receiving the acceleration information received by the wireless receiving means, wherein the game processor determines an intensity of a punch based on the acceleration information.

In a certain embodiment, the acceleration sensor may be a piezoelectric buzzer including a metal plate and a piezoelectric ceramic plate pasted on the metal plate, and outputs an acceleration correlated signal corresponding to a magnitude of the swing in a direction angular to a surface of the piezoelectric ceramic plate.

In order to perform a wireless communication by an infrared light, the wireless transmitting means includes an infrared-light transmitting means, and the wireless receiving means includes an infrared-light receiving means.

Furthermore, in a preferred embodiment, the inputting apparatus includes a boxing glove-shaped cushion member, and a main body provided to be integrated with the cushion member and held by the hand of the game player. In addition, the inputting apparatus includes a wristband provided to be integrated with the cushion member, and attached to a wrist of the game player.

A glove-type inputting apparatus (34) shown in an embodiment includes a main body (40) held by a hand of a game player and swung in a real space, and in this main body, an acceleration sensor formed of a piezoelectric buzzer element (82) is accommodated, for example. When the game player swings the main body, that is, an inputting apparatus, as if to actually play boxing, acceleration information is detected by the acceleration sensor.

An MCU (60) provided in the glove-type inputting apparatus drives an infrared LED (62) corresponding to the acceleration information. Therefore, the acceleration information is transmitted in a wireless manner.

In an embodiment, an infrared light-receiving demodulating portion (32) is provided in a game machine (12), and the light-receiving demodulating portion receives an infrared light, and demodulates the acceleration information. The acceleration information is input into a game processor (64) provided in the game machine.

The game processor displays a graphics of a boxer on a monitor, and changes a game screen corresponding to a game state. Furthermore, the game processor determines an intensity of the punch based on the acceleration information. In addition, the game processor, if required, calculates a damage value according to the intensity of the punch, calculates a stamina value of the boxer on the game screen from the damage value, and displays the stamina value.

According to the present invention, the inputting apparatus is swung in the real space as if to actually play boxing so that the game is progressed, thus possible to realize a real sensory boxing game as if to actually play boxing for the game player. In addition, the acceleration information from the inputting apparatus is transmitted in a wireless manner to the game processor so that when swinging the inputting apparatus as if to actually play boxing, too, functionality of the inputting apparatus is not destroyed.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a flowchart showing a specific operation of an opponent boxer punch result determining process by the game processor in the FIG. 14 embodiment.

BEST MODE FOR PRACTICING THE INVENTION

Figure 1:
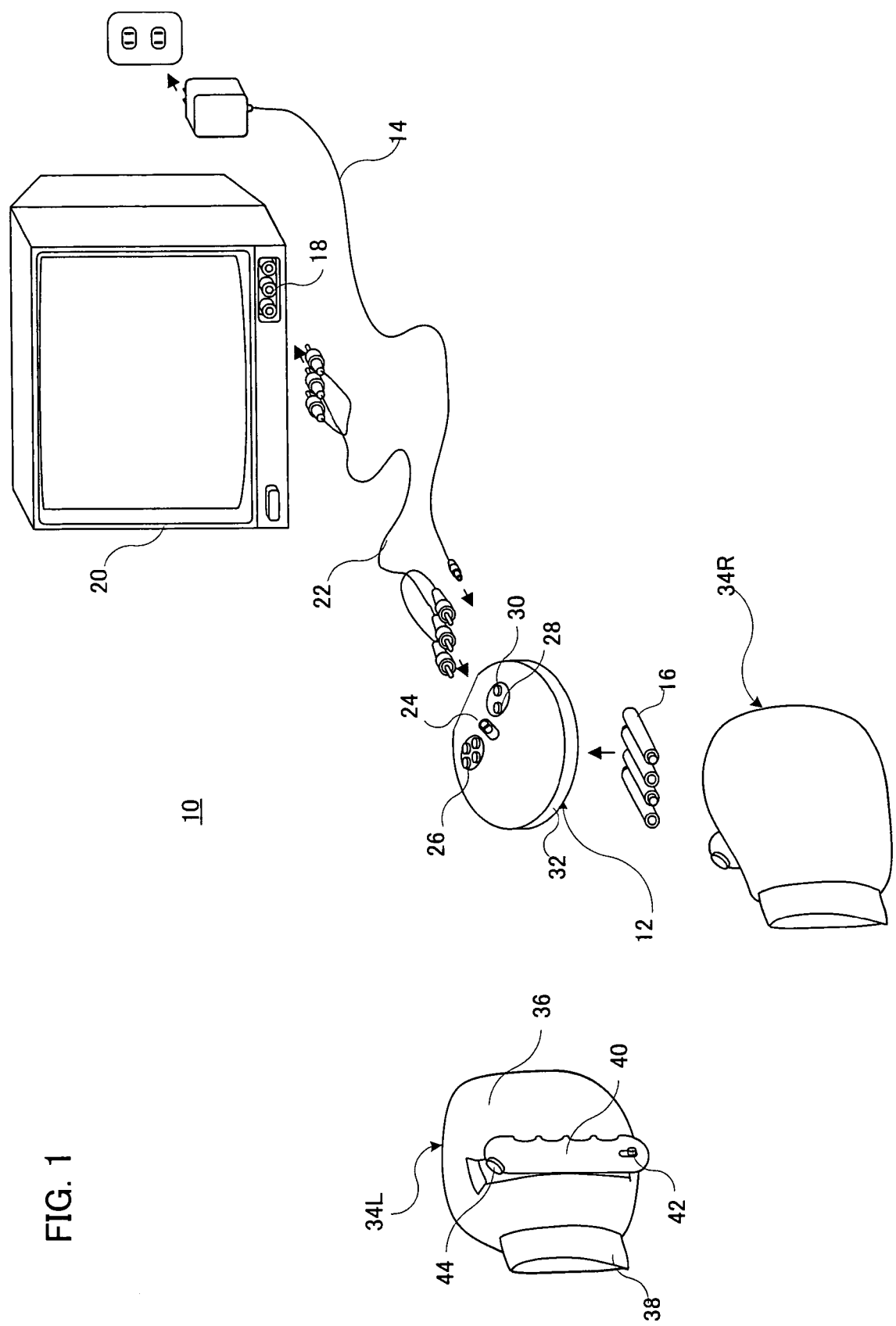
FIG. 1 is an illustrative view showing whole structure of a sensory boxing game system of one embodiment of the present invention.

Referring to FIG. 1, a sensory boxing game system 10, that is, one embodiment of the present invention, includes a game machine 12. A direct current (DC) power is supplied to this game machine 12 by an AC adapter 14. It is noted that this may be replaced by a battery 16. Furthermore, the game machine 12 is connected to an AV terminal 18 of a television monitor 20 through an AV cable 22.

In addition, the game machine 12 includes a housing, and above this housing, a power switch 24, a direction button 26, a determination key 28, and a cancel key 30 are provided. The direction button 26 has separate buttons for four directions (up and down, and right and left), and is used for moving a cursor in order to select a menu or a game mode on a display screen of the television monitor 20, for example. The determination key 28 is used for determining an input into the game machine 12. Furthermore, the cancel key 30 is used for canceling the input into the game machine 12.

Furthermore, the game machine 12 is provided with an infrared light-receiving portion 32, and this infrared light-receiving portion 32 receives an infrared signal from an infrared LED 62 (FIG. 3, FIG. 4) of a glove-type inputting apparatus 34 (34L, 34R) described later.

Figure 4:
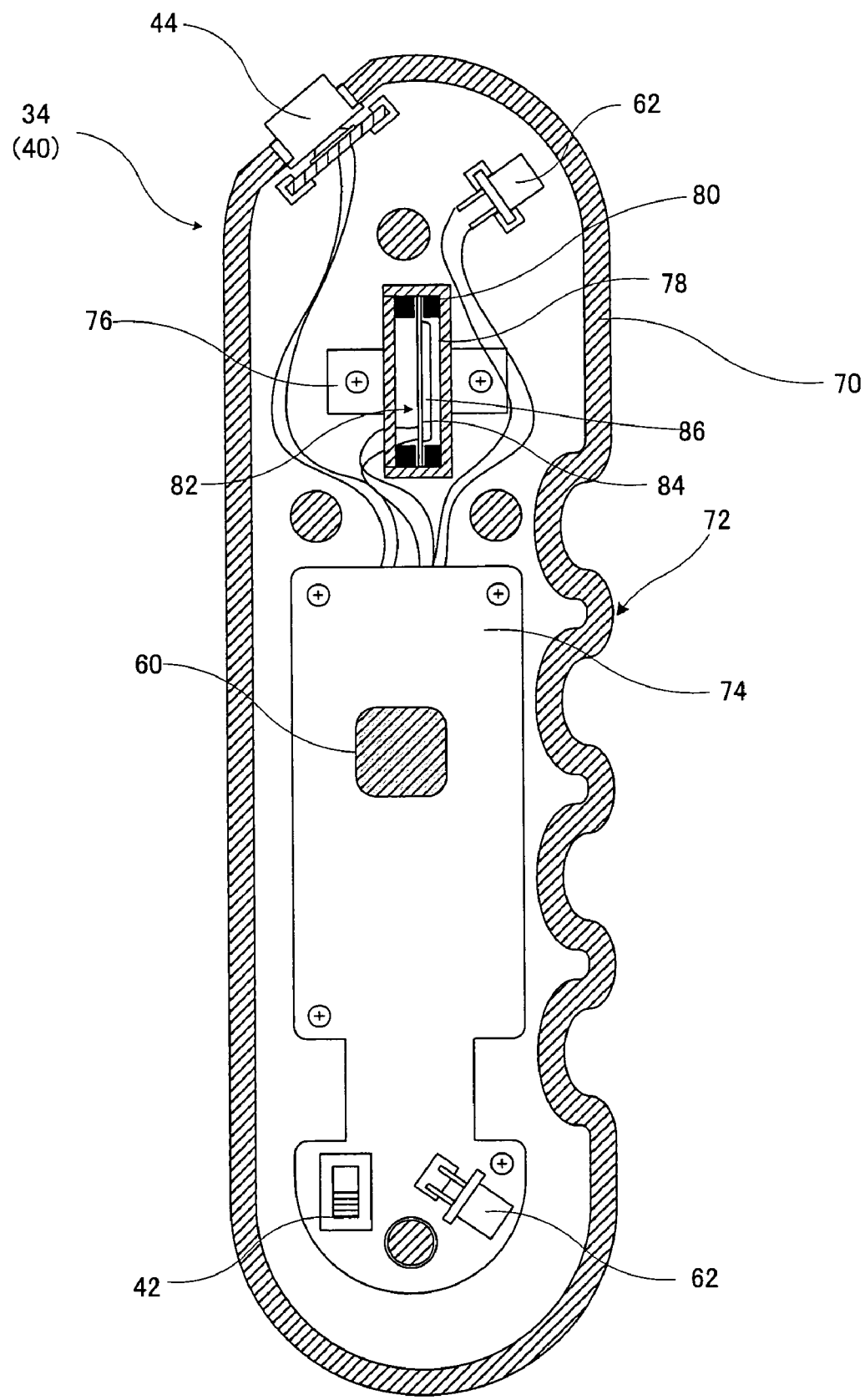
FIG. 4 is an illustrative view showing internal structure of a glove-type inputting apparatus in the FIG. 1 embodiment.

In this embodiment, two glove-type inputting apparatuses 34 are used. The glove-type inputting apparatus 34 includes a portion (glove) 36 that is shaped like a boxing glove made of a cushion member covered by a nylon material, for example. In an edge portion on a near side of the glove 36, a wristband 38 is mounted. The wristband 38 is rendered opened and closed by a hook and loop fastener (trademark: Magic Tape), for example. In addition, in the glove 36, an inputting apparatus main body 40 shown in detail in FIG. 4 is mounted.

In the main body 40, a power switch 42 and a guard key 44 are provided. The power switch 42 is a switch for turning on a power (not shown) when this glove-type inputting apparatus 34 is used. The guard key 44 is a key switch for allowing a boxer on a player's side to perform a "left guard" or a "right guard" described later during a game play, and is used for guarding a punch from an opponent boxer. It is noted that this guard key 44 offers an equivalent function to the above-described determination key 28 of the game machine 12 at a time of "select a game mode and an opponent boxer" described later, and so forth.

The player holds left-handed and right-handed inputting apparatus main bodies 40 by respective palms of the player's hand, pushes forward the inputting apparatuses 34R and 34L as if to play a shadow boxing with the wristbands 38 worn around the wrist so as to play the sensory boxing game. At this time, the glove 36 functions as a cushion in order to prevent danger caused when the inputting apparatus main body 40 is erroneously hit against a television 20 or an adjacent person, and in addition, the glove 36 is shaped like an actual boxing glove, thus effective to give a real sensation or feeling of playing boxing to the player. Furthermore, the glove-type inputting apparatus 34 is connected to the player's wrist by the wristband 38 so that even if the player erroneously releases the main body 40, the glove-type inputting apparatus 34 is not thrown out from the player's hand.

As described later, the glove-type inputting apparatus 34 is provided with a piezoelectric buzzer element used as an acceleration sensor, and the game machine 12 receives an acceleration correlated signal from the piezoelectric buzzer element so as to play the boxing game against an opponent boxer 46 on the game screen shown in FIG. 2.

Figure 2:
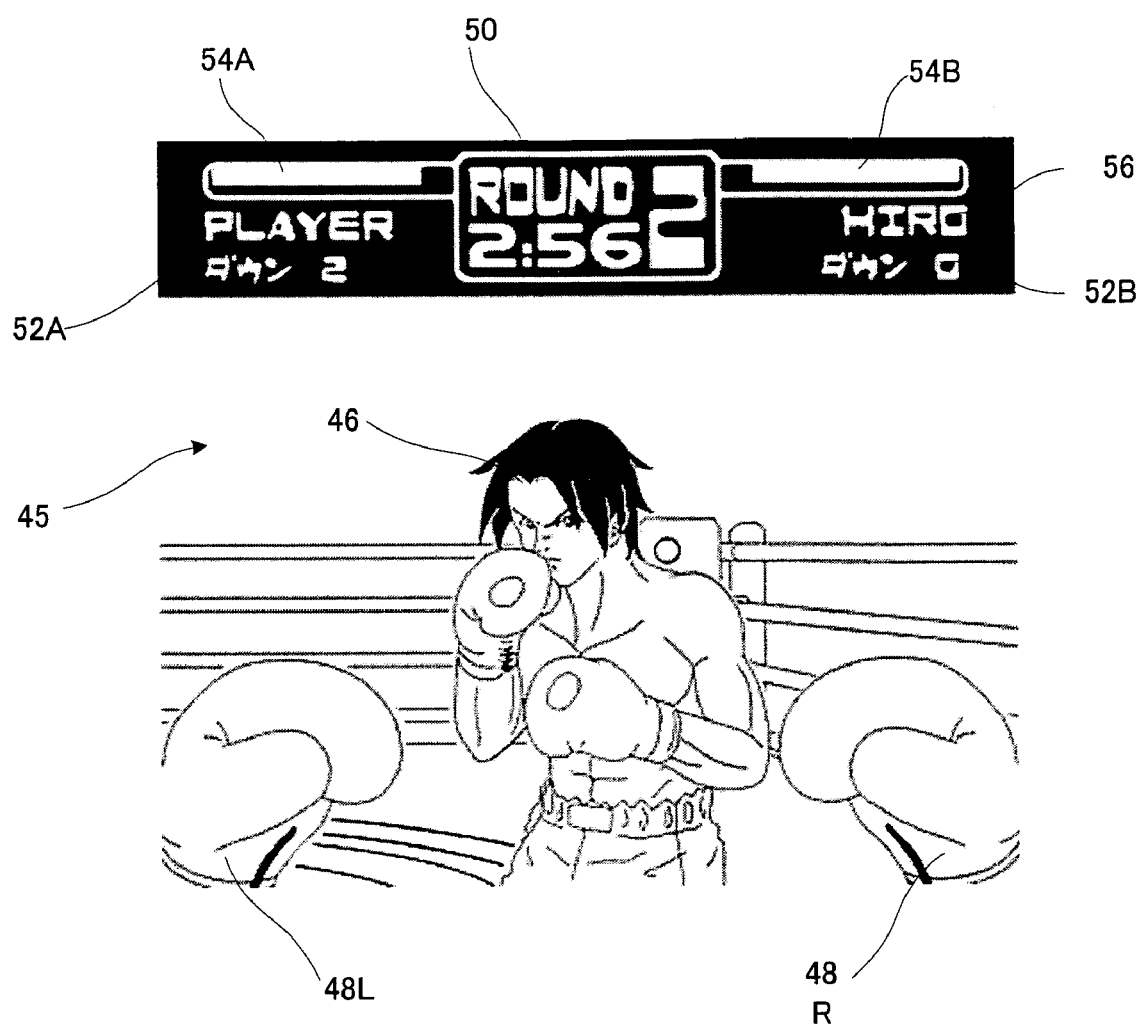
FIG. 2 is an illustrative view showing one example of a game screen displayed on a television monitor in a FIG. 1 embodiment.

Referring to FIG. 2, a game screen 45 displayed on the television monitor 20 in the sensory boxing game system 10 is displayed as a graphic seen from a player's viewpoint, and the boxer on the player's side (player's boxer) is displayed by the glove. In this game screen 45, the opponent boxer 46 and the gloves 48L and 48R of the player's boxer are displayed as a moving image display-use object (sprite) together with one portion of a boxing ring. Above this image, one portion of a still image display-use object (text screen) is displayed in a predetermined manner.

At the center of an upper portion of the screen, a round displaying portion 50 is formed, and in this round displaying portion 50, the number of rounds and a remaining time-period are displayed. At the left of the round displaying portion 50, a player's boxer displaying portion 52A is formed, and at the right, an opponent's displaying portion 52B is formed. In each of the displaying portions 52A and 52B, stamina value portions 54A and 54B are provided, and in addition, in the opponent boxer displaying portion 52B, a name displaying portion 56 for displaying a name of the opponent boxer ("HIRO" in this embodiment) is further provided. It is noted that a displaying manner such as this game screen 45 is merely an example.

In this sensory boxing game system 10, when the game player swings the glove-type inputting apparatus 34 corresponding to a movement of the opponent boxer 46 displayed on the game screen 45 as if to play an actual boxing in a real space, a game processor 64 (FIG. 4) detects the acceleration correlated signal from the piezoelectric buzzer element or a state of the guard key 44 (FIG. 1) by the infrared signal transmitted from the infrared LED 62 (FIG. 4) to the infrared light-receiving portion 32, and based on this, an intensity of the punch is calculated, a status of each boxer is changed, and so forth, for example.

It is noted that the left-handed glove-type inputting apparatus 34L and the right-handed glove-type inputting apparatus 34R have the completely same structure as shown in this FIG. 4 so that "L" indicating left-handed, and "R" indicating right-handed will be omitted unless otherwise specified.

The glove-type inputting apparatus 34 includes an acceleration sensor circuit 58, the acceleration sensor circuit 58 includes a piezoelectric buzzer element 82 shown in FIG. 4 described later and its associated circuit, and the acceleration correlated signal from this acceleration sensor 58 is applied to the MCU 60. The MCU 60 is 8 bits of a 1-chip microcomputer, for example, and converts the acceleration correlated signal from the piezoelectric buzzer element into a digital signal, and applies this digital signal to the infrared LED 62. It is noted that in the glove-type inputting apparatus 34, the above-described guard key 44 (FIG. 1) is further provided, and a state (value) of this guard key 44 is also read by the MCU 60.

The digitally modulated infrared signals from each of the infrared LEDs 62 of the two glove-type inputting apparatuses 34 is received by an infrared light-receiving demodulating portion 32 of the game machine 12, digitally demodulated, and then, input into the game processor 64. One bit of this digital signal is transmitted as "1" or "0" corresponding to whether or not the guard key 44 is turned on or off, and therefore, the game processor 64 is capable of recognizing whether "right guard" is set or "left guard" is set by checking the bit.

As the game processor 64, an arbitrary kind of a processor is used. However, in this embodiment, a high-speed processor (trademark:XaviX) developed by the applicant of the present invention and already filed as a patent application is used. This high-speed processor is disclosed in detail in Japanese Patent Laying-open No.10-307790 [G06F13/36, 15/78] and U.S. patent application Ser. No. 6,070,205 corresponding thereto.

Although not illustrated, in addition to various processors such as an operation processor, a graphic processor, a sound processor, a DMA processor, and etc., the game processor 64 includes an A/D converter used for fetching an analog signal, and an input/output control circuit that receives an input signal such as an key operation signal and an infrared signal and applies an output signal to an external device. Therefore, the demodulated signal from the infrared light-receiving portion 32 and the input signal from the operation keys 26-30 are applied to the operation processor via this input/output control circuit. The operation processor executes a necessary operation corresponding to the input signal, and applies a result to the graphic processor, and etc. Therefore, the graphic processor and the sound processor execute an image process and a sound process corresponding to the operation result.

It is noted that in a case that the infrared LED 62 provided in the main body 40 of the glove-type inputting apparatus 34 forms one portion of a wireless transmitting means, the infrared light-receiving demodulating portion 32 provided in the game machine 12 is to form one portion of a wireless receiving means. It is noted that such the wireless transmitting means and the wireless receiving means may be a means that uses a normal radio wave, besides an infrared light.

In the processor 64, an internal memory 66 is provided, and the internal memory 66 includes a ROM or a RAM (SRAM and/or DRAM). The RAM is used as a temporary memory, a working memory, or a counter or a register area (temporary data area), and a flag area. It is noted that the external memory 68 (ROM and/or RAM) is connected to the processor 64 through an external bus. A game program is stored to this external memory 68 in advance.

The processor 64 executes operations, graphic processes, sound processes, and etc., in each of the above-described processors according to the input signal from the infrared light-receiving demodulating portion 32 and the operation keys 26-30, and outputs a video signal and an audio signal. The video signal is a signal composed of a text screen and a sprite image shown in FIG. 2 described above, and the video signal and the audio signal are applied to the television monitor 20 through the AV cable 22 and the AV terminal 18. Therefore, the game screen 45 as shown in FIG. 2 is displayed on the screen of the television monitor 20, together with a necessary sound playing (sound effect, game music), for example.

The main body 40 of the glove-type inputting apparatus 34 includes a housing 70 molded of transparent (or translucent: transparency to light) plastic, and in this housing 70, a concavity and convexity 72 into which the fingers for holding the housing 70 fit with each other is formed. Inside the housing 70, a main board 74 is stored, and on this board 74, the above-described MCU 60 is mounted. In addition, on the main board 74, the power switch 42 is further provided, and in addition, one infrared LED 62 is fixed. Another infrared LED 62 is fixed on an upper portion of the housing 70.

A piezoelectric buzzer case 76 is mounted between the substrate 74 and the above LED 62 within the housing 70, and in this piezoelectric buzzer case 76, a mounting portion 78 is formed. Within the mounting portion 78, the piezoelectric buzzer element 82 is mounted via a rubber packing 80. This piezoelectric buzzer element 82 forms the acceleration sensor circuit 58 (FIG. 5).

As well known, the piezoelectric buzzer element 82 includes a ceramic plate 86 pasted on a metal plate 84, and if a power voltage is applied between the metal plate 84 and an electrode on the ceramic plate 86, a buzzer sound is generated. In this embodiment, the piezoelectric buzzer element 82 thus structured is used as the acceleration sensor. That is, the ceramic plate 84 is a piezoelectric ceramic, and it is well known that when a stress is worked onto the piezoelectric ceramic, an electric signal is generated from the piezoelectric ceramic. As a consequence, in this embodiment, corresponding to a movement (right and left movement in FIG. 4, that is, a direction angular to a surface of the piezoelectric buzzer) of the piezoelectric buzzer element 82, that is, the glove-type inputting apparatus 34, the electric signal generated in the ceramic plate 86 is fetched between the metal plate 84 and the above-described electrode. However, in this embodiment, as described later, as a result of a predetermined digital signal process being performed according to the electric signal, an acceleration correlated digital signal or data is to be fetched by the MCU 60.

At an oblique surface of an upper edge of the housing 70, the above-described guard key 44 is mounted.

Figure 5:
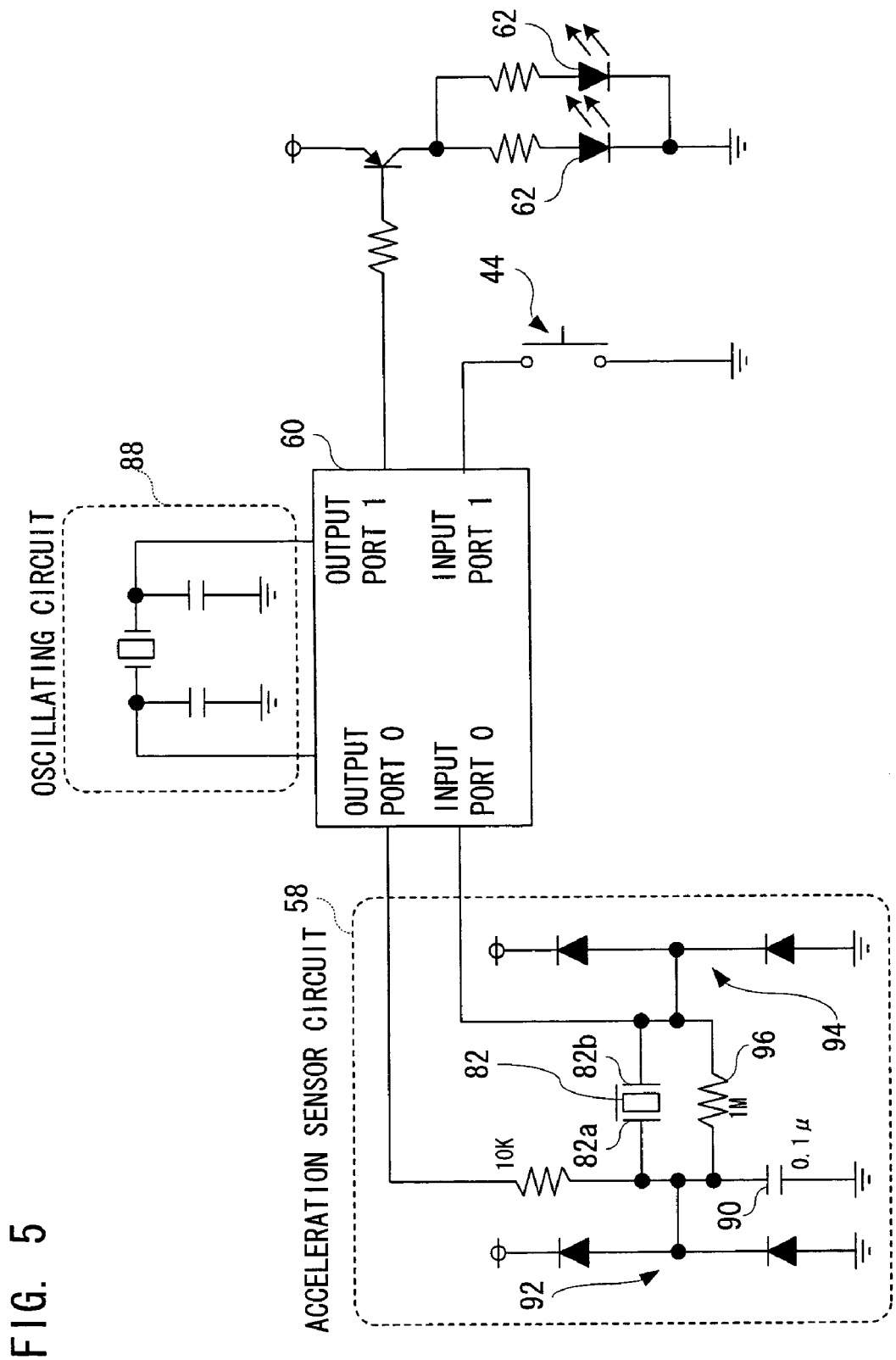
FIG. 5 is a circuit diagram showing the glove-type inputting apparatus.

Referring to FIG. 5, the piezoelectric buzzer element 82 described above is included in the acceleration sensor circuit 58. In addition, in the MCU 60, an externally attached oscillating circuit 88 is provided for the MCU 60, and the MCU 60 operates in response to a clock signal from this oscillating circuit 88.

Then, the MCU 60 outputs a rectangular-shaped waveform signal from an output port 0, and applies this signal to one electrode 82a of the piezoelectric buzzer element 82 through 10 kilo ohms of a resistance, for example. The electrode 82a of the piezoelectric buzzer element 82 may be the above-described metal plate 84, and is grounded via a capacitor 90 such as 0.1 µF, for example. Furthermore, a diode circuit 94 is connected to the electrode 82a, and a fluctuation band of the voltage is thereby rendered within a predetermined range.

The other electrode 82b of the piezoelectric buzzer element 82 is connected to an input port 0 of the MCU 60, and in addition, connected to the diode circuit 94. Thereby, the fluctuation band of the voltage is rendered within the predetermined range. It is noted that the two electrodes 82a and 82b of the piezoelectric buzzer element 82 is electrically separated by a relatively high resistance 96 such as 1 Mega ohms, for example.

Figure 6:
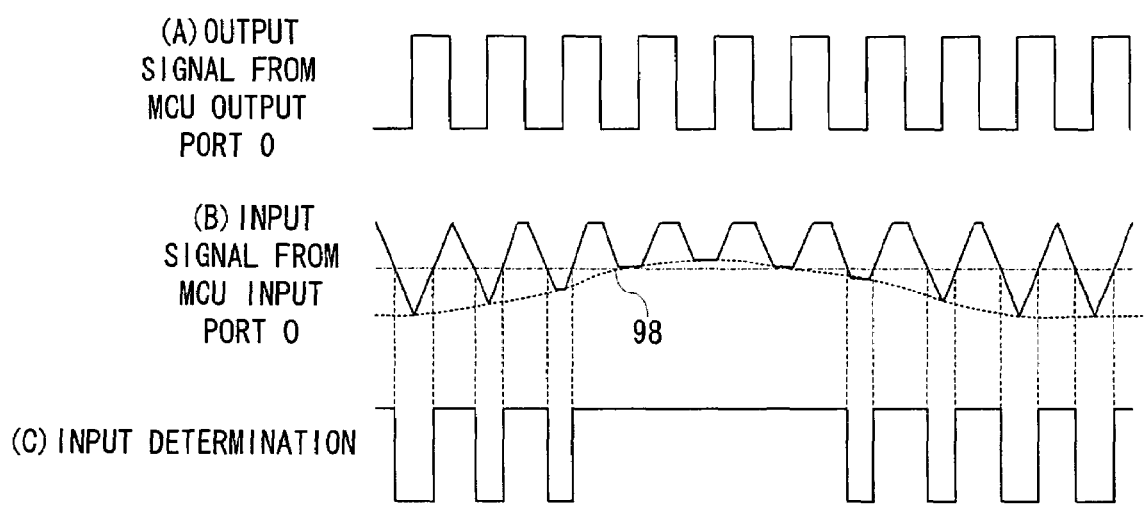
FIG. 6 is a waveform diagram of each portion showing an operation of the glove-type inputting apparatus.

When the rectangular-shaped waveform signal shown in FIG. 6(A) is applied to the electrode 82a of the piezoelectric buzzer element 82, concurrent with a charge and discharge of the capacitor 90, a triangular waveform signal as in FIG. 7(B) is input into the input port 0 of the MCU 60. It is noted that a size (waveform high value) of the rectangular-shaped waveform signal and a size (waveform high value) of the triangular waveform signal are restrained by the diode circuits 92 and 94, respectively.

Figure 7:
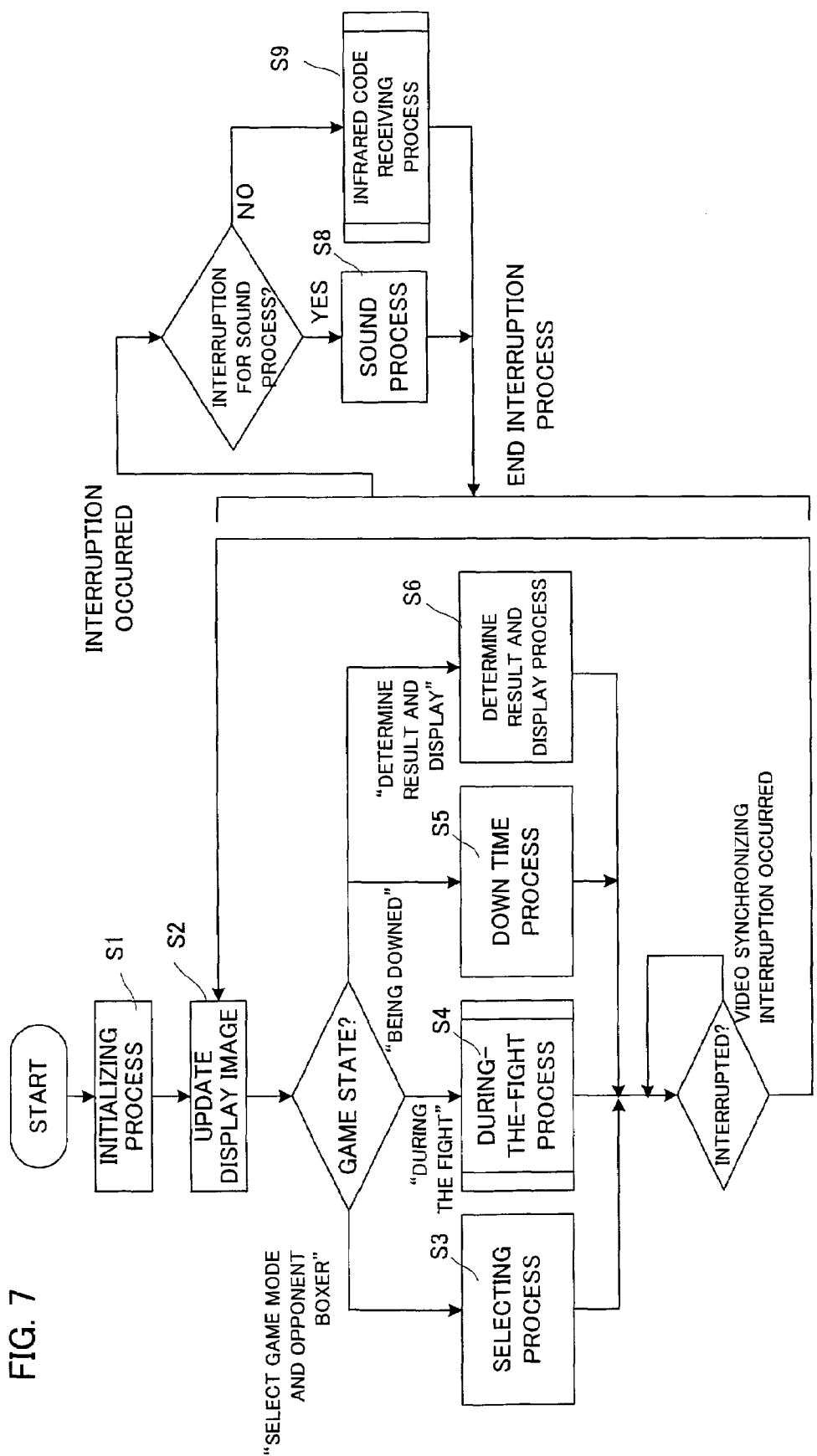
FIG. 7 is a flowchart showing whole structure of the FIG. 1 embodiment.

When the glove-type inputting apparatus 34 (FIG. 4) is stationary, that is, when the apparatus 34 is not displaced, a level on a minus side of the triangular waveform signal does not change as shown in a left edge of FIG. 7(B). However, if the glove-type inputting apparatus 34 is displaced by the operator to a right or left direction in a three-dimensional real space in FIG. 4, due to a piezoelectric effect concurrent with the displacement, a voltage is produced in the piezoelectric buzzer element 82. The acceleration correlated voltage biases the level on the minus side of the triangular waveform signal. Thus, if the glove-type inputting apparatus 34 is displaced, the acceleration correlated voltage at a level corresponding to the size of the displacing acceleration is produced to the piezoelectric buzzer element 82. Therefore, the level on the minus side of the triangular waveform signal input into the input port 0 of the MCU 60 varies corresponding to a level of the acceleration correlated voltage as shown in FIG. 7 (B).

As described later, the MCU 60 converts a level change on the minus side of such the triangular waveform signal into acceleration data or acceleration correlated data, and drives the LED 62 (FIG. 3) corresponding to the acceleration data.

Herein, referring to FIGS. 7 and 8, a schematic operation of the sensory boxing game system 10 of the FIG. 1 embodiment will be described. The power switches 24 and 42 shown in FIG. 1 are turned on so as to start the game. Firstly, the game processor 64 shown in FIG. 3 executes an initializing process in a step S1. More specifically, a system hardware and each variable are initialized.

Figure 8:
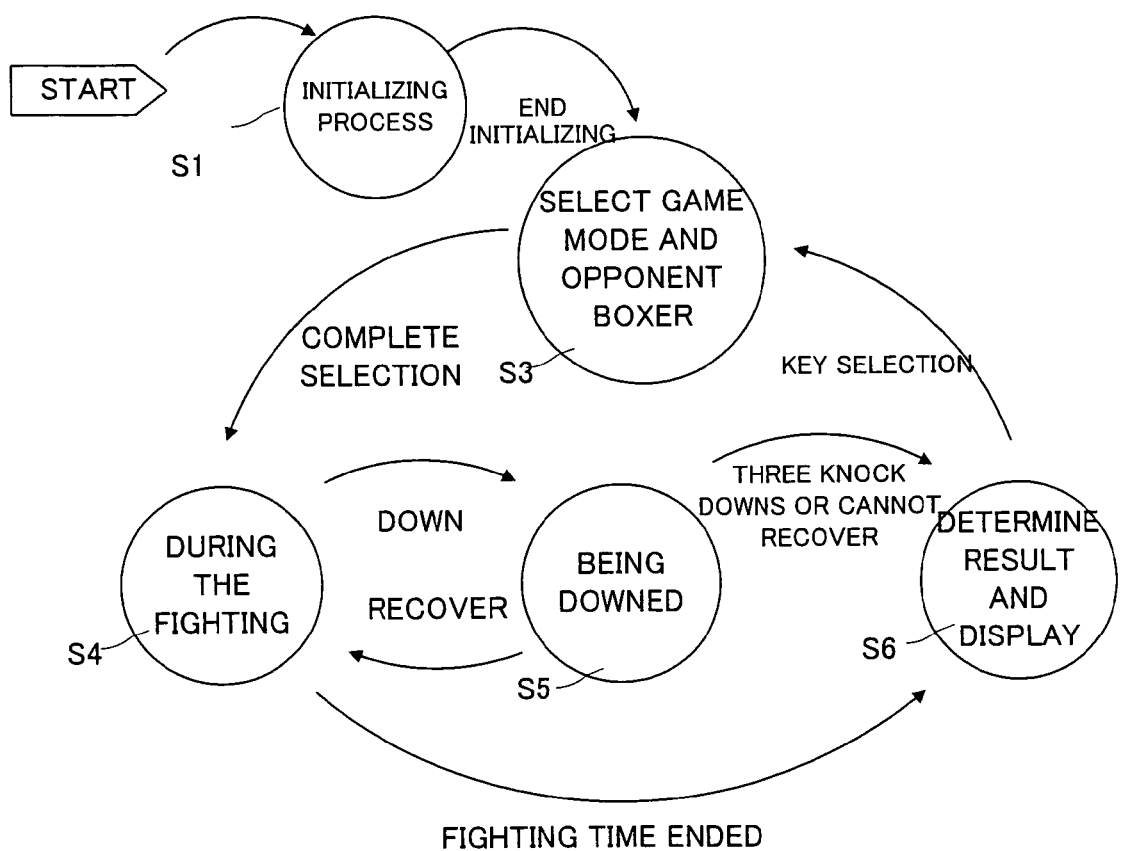
FIG. 8 is an illustrative view showing a state diagram of the FIG. 1 embodiment.

Thereafter, the game processor 64 updates the image signal in a step S2 in FIGS. 7 and 8 so as to update the image displayed on the monitor 20. It is noted that this displayed image updating is executed by each 1 frame (television frame or video frame).

Then, the game processor 64 executes a process corresponding to the game state. However, the process to be done first is "select game mode and opponent boxer". In this selection of the game mode and the opponent boxer, the operator or the game player operates a selection key 26 shown in FIG. 1 in a step S3 in FIGS. 7 and 8 so as to selectively set the game mode, a level of difficulty of the game, and the opponent boxer.

In the actual boxing game of "during the fight" state shown in a step S4 in FIGS. 7 and 8, each boxer fights with punches against each other. In a case that the boxer is hit by the punch, and knocked down, a "down time process" is executed in a step S5 in FIG. 7 and FIG. 8.

In the down time process, when the boxer on a game player side (the player's boxer) is knocked down, the stamina value is restored at each time that the inputting apparatus 34 is swung, and if the stamina value reaches a predetermined value in 10 counts or earlier, the boxer is returned to the game state of the during the fight in the preceding step S4. Otherwise, the boxer moves to a game state of "determine result and display process" shown in a step S6 in FIG. 7 and FIG. 8. To the contrary, when the opponent boxer is knocked down, a returning or end fight is determined based on a behavior algorism of the opponent boxer.

It is noted that in the "determine result and the display" process, a victory-or-defeat determination in a case that the time runs out, and a display of a result of the fight are performed. It is noted that although the during-the-fight process shown in the step S4 will be described in detail by referring to a flowchart later, a detailed flowchart of the steps S5 and S6 are omitted.

Thereafter, if there is a video synchronizing interruption, an image updating of the step S2 (FIG. 7) is executed. In addition, the sound process of a step S8 in FIG. 7 is executed when a sound interruption occurred, and the game music and the sound effect are thereby output. When an interruption other than interruptions for the sound process occurred, the game processor 64 receives the infrared signal (code) input from the infrared light-receiving portion 32 in a step S9 in FIG. 7.

Figure 9:
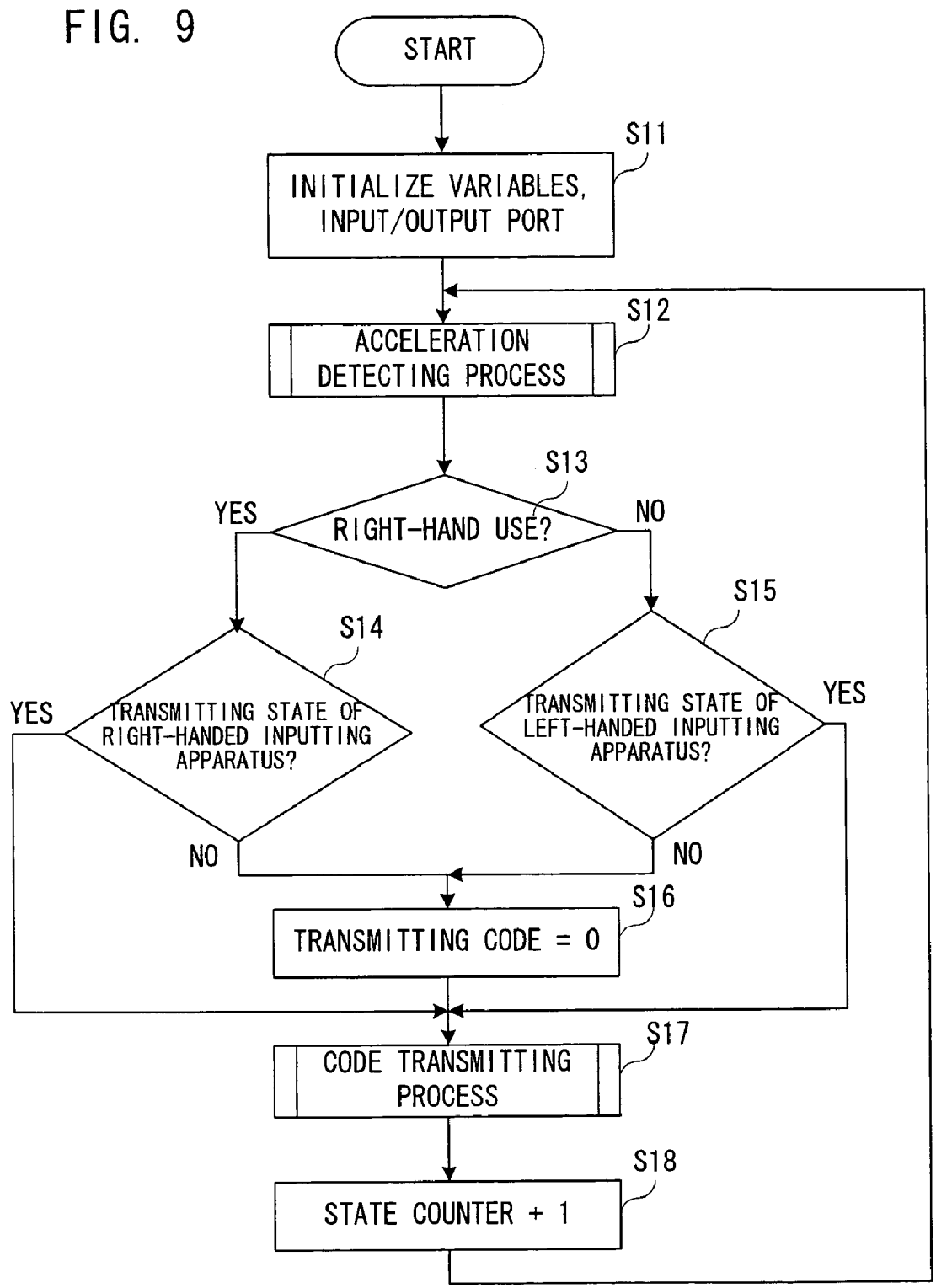
FIG. 9 is a flowchart showing whole structure of an MCU of a FIG. 4 embodiment.

Referring to FIG. 9, FIG. 9 shows a whole operation of the MCU 60 of the glove-type inputting apparatus 34, and in a first step S11, the MCU 60 initializes variables that the MCU 60 handles such as a detection offset value, an offset counter, and etc., described later, and in addition, initializes the input port and the output port (FIG. 5).

Thereafter, via an acceleration detecting process (described in detail later) in a step S12, the MCU 60 determines whether the glove-type inputting apparatus 34 is the right-handed inputting apparatus 34R or the left-handed inputting apparatus 34L. If a specific input port of the MCU 60 is set to "1", the apparatus 34 is the right-handed inputting apparatus 34R, and if "0", the apparatus 34 is the left-handed inputting apparatus 34L in a step S13 so that the specific input port of the MCU 60 needs to be sensed in the step S13. Then, it is determined whether or not the current state is the transmitting state in a step S13. If "YES" in the step S13, that is, in a case of the right-handed inputting apparatus 34R, the determination is made in a step S14, and if "NO" in the step S13, that is, in a case of the left-handed inputting apparatus 34L, the determination is made in a step S15.

Although not illustrated, the MCU 60 has a state counter as a software counter, and the transmitting state is established at each time that this state counter becomes a predetermined value. Therefore, it is detected whether or not this state counter is rendered the predetermined value in the steps S14 and S15. In a case of "NO" in the step S14 or S15, the transmitting code is rendered "0" in a step S16, or in a case of "YES" in the step S14 or S15, the process directly advances to a code transmitting process (described in detail later) in a step S17. After executing the code transmitting process in the step S17, the process increments (+1) the state counter (not shown) in a step S18, and then, returns to the step S12. It is noted that as described later, the code transmitting process is performed in a bit serial, and a necessary time-period for transmitting 1 bit is approximately some micro seconds, that is, extremely short period of time.

Figure 10:
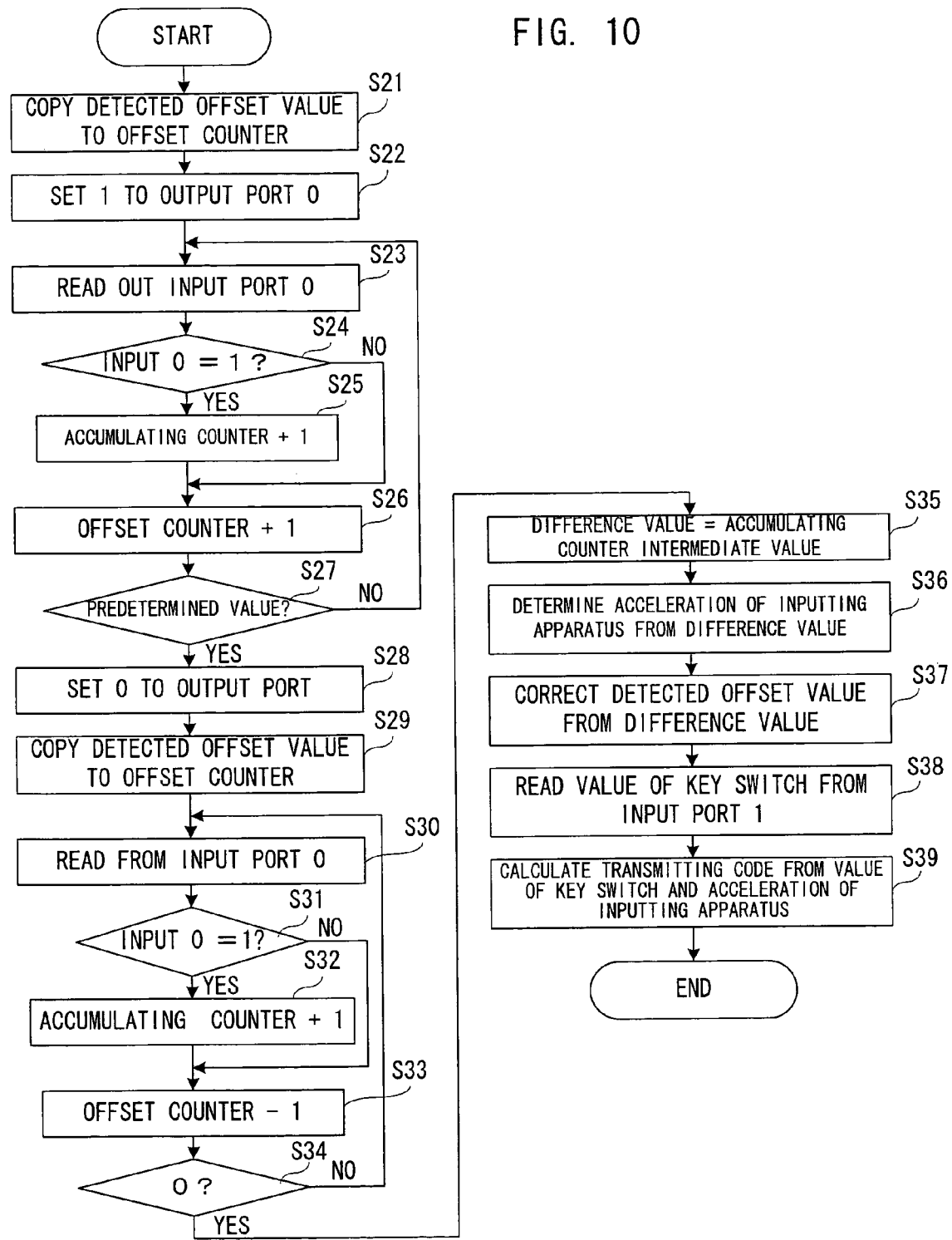
FIG. 10 is a flowchart showing a specific operation of an acceleration detecting process shown in FIG. 9.

FIG. 10 is a flowchart showing in detail the step S12 in FIG. 9, and in a first step S21 of this acceleration detecting process, the MCU 60 copies to the offset counter (not shown) a detected offset value set to the register (not shown). The "detected offset value" is a value for inputting in an equal manner in time a high level and a low level of a rectangular waveform determination shown in FIG. 6(A) when no voltage is generated in the piezoelectric buzzer element 82, and this detected offset value is set to an arbitrary default value at a time of starting the operation.

In a step S22 that follows the step S21, the MCU 60 sets "1" to the output port 0. That is, "1", that is, the high level, is output. Next, in a step S23, the MCU 60 reads data from the input port 0.

In a step S24, it is determined whether or not the data of the input port 0 read in the step S23 is "1". If "YES", the MCU 60 increments (+1) an accumulating counter (not shown) in a succeeding step S25. The "accumulating counter" is a counter for calculating a period during which the high level is being read, incremented when the input port is "1" or the high level, and is left intact when the input port is "0".

In a case of incrementing the accumulating counter in the step S25, or in a case of determining "NO" in the step S24, in a succeeding step S26, the MCU 60 increments the offset counter, and determines whether or not the count value of the offset counter reaches the predetermined value in a next step S27. That is, as long as "NO" is determined in this step S27 after setting "1" to the output port 0 in the step S22, the MCU 60 continuously outputs "1" of the output port 0.

Furthermore, in a case that the count value of this offset counter reaches the predetermined value in the step S27, in a succeeding step S28, the MCU 60 sets "0", that is, the low level, to the output port 0. In a succeeding step S29, the MCU 60 copies to the offset counter the detected offset value set to the register.

In a succeeding step S30, the MCU 60 reads the data from the input port 0. In a step S31, it is determined whether or not the data of the input port 0 read in the step S30 is "1". If "YES", the MCU 60 increments (+1) the accumulating counter in a next step S32.

In a case of incrementing the accumulating counter in the step S32, or in a case of determining "NO" in the step S31, the MCU 60 decrements (−1) the offset counter in a succeeding step S33, and determines whether or not the count value of the offset counter reaches 0 (zero) in a next step S34. That is, as long as "NO" is determined in this step S34 after setting "0" to the output port 0 in the step S28, the MCU 60 continuously outputs "0" of the output port 0.

Then, if "YES" is determined in the step S34, that is, if the offset counter is rendered zero (0), in a succeeding step S35, the MCU 60 subtracts an intermediate value from the count value of the accumulating counter so as to evaluate the difference. Herein, the intermediate value is "N/2" where "N" is the total number of repetitions of the number of repetitions for the high level detection returning from the step S27 to the step S23, and the number of repetitions for the low level detection returning from the step S34 to the step S30. The reason why the difference is evaluated by using the intermediate value in this step S35 is that a ratio (duty 50%) of a period between the high level and the low level of an ideal piezoelectric buzzer element, and in a state that no acceleration correlated voltage is generated in the piezoelectric buzzer element is used as a reference for determining the acceleration.

To be described in detail, a count value of the accumulating counter is the number of reading "1" or the high level into the input port 0 as described above, and in a case of being the ideal piezoelectric buzzer element and that no voltage is generated, the difference of the "accumulated counter intermediate value" is supposed to be zero (0). Therefore, in a case that any voltage is generated to the piezoelectric buzzer element 82, a meaningful value is obtained as the difference. Herein, in a step S36, a displacing acceleration of the glove-type inputting apparatus 34 is determined according to this difference value. Basically, data that multiplies the difference value data by a predetermined coefficient is the acceleration data or the acceleration correlated data.

Thereafter, in a step S37, the detected offset value is corrected based on the difference value evaluated in the step S35. That is, in an initial state, the game player or the operator does not swing the glove-type inputting apparatus 34 so that the acceleration correlated voltage is not generated in the piezoelectric buzzer element 82. In spite thereof, the meaning that the difference value that is not 0 (zero) is detected in the step S35 is that the set detected offset value set in the step S21 is not correct, in view of a characteristic of the piezoelectric buzzer element used for the glove-type inputting apparatus. That is, this means that the piezoelectric buzzer element is not the ideal piezoelectric buzzer element. As a consequence, in such the case, in order to correct the bias of a characteristic of each piezoelectric buzzer element from the characteristic of an ideal piezoelectric buzzer element, the detected offset value is made to be corrected according to the difference value in the step S37.

On the other hand, if the detected offset value is always made to be changed or to be corrected in the step S37, even if the piezoelectric buzzer element is the difference value that as a result of the acceleration correlated voltage being actually generated, the detected offset value is to be corrected. However, a voltage generating period of the piezoelectric buzzer element is very short compared to other periods. Thus, there is no problem if the step S37 is executed at each time that the difference value is detected. That is, a proper correction is made at a time of starting an actual boxing game so that even if the step S37 is subsequently executed at each time that the acceleration is detected, there occurs no large variance to the detected offset value, thus no problem to the actual boxing game.

In a succeeding step S38, the MCU 60 reads from the input port 1 the value "1" or "0" of the key switch, that is, the guard key 44, and in a succeeding step S39, the MCU 60 further adds a parity bit based on the value from the guard key 44 and the displacing acceleration or a moving acceleration of the glove-type inputting apparatus 34 determined in the preceding step S36, calculates the transmission code, and then, returns to the step S13 (FIG. 9) of a main routine.

Figure 3:
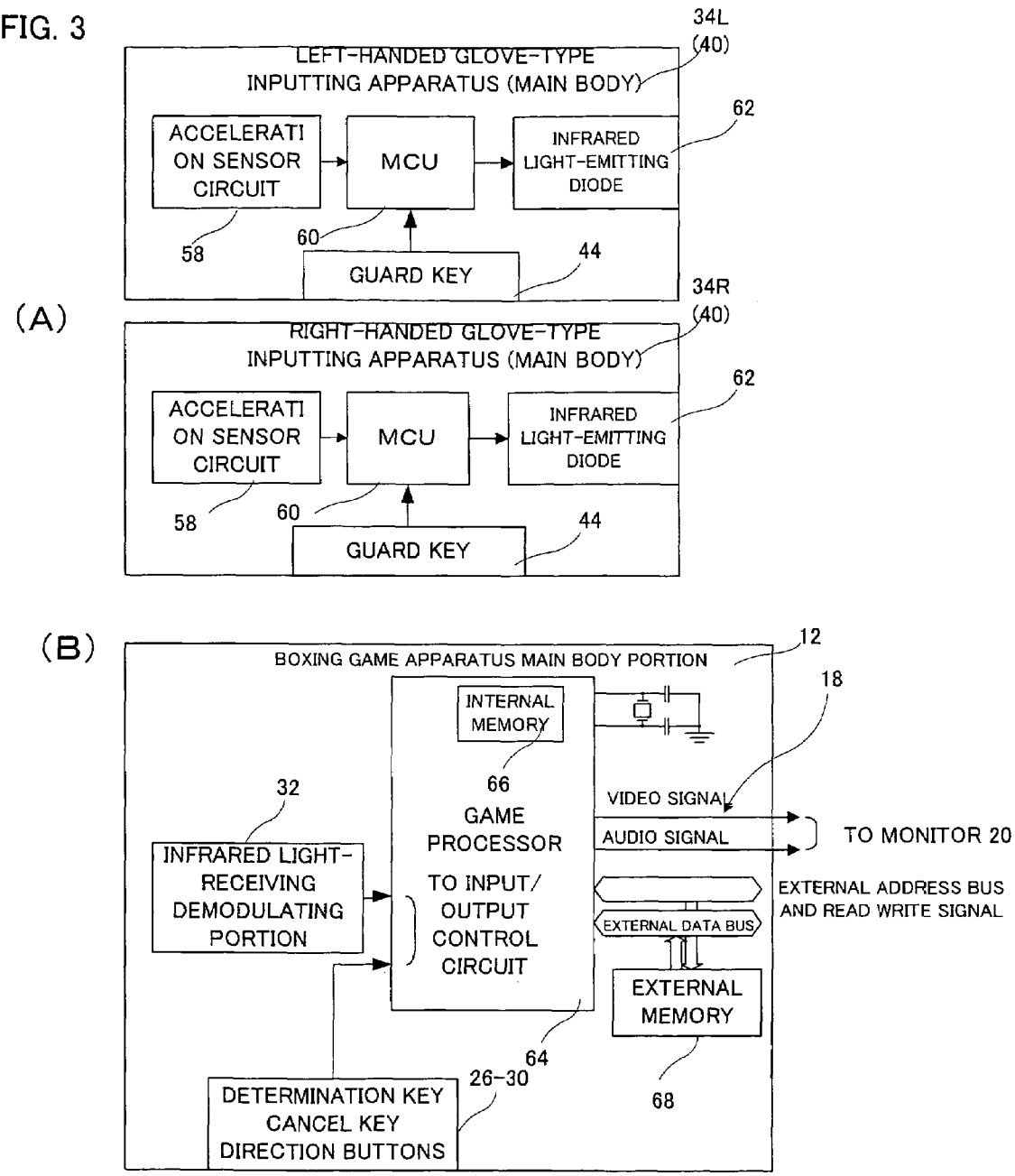
FIG. 3 is a block diagram showing the FIG. 1 embodiment.
Figure 11:
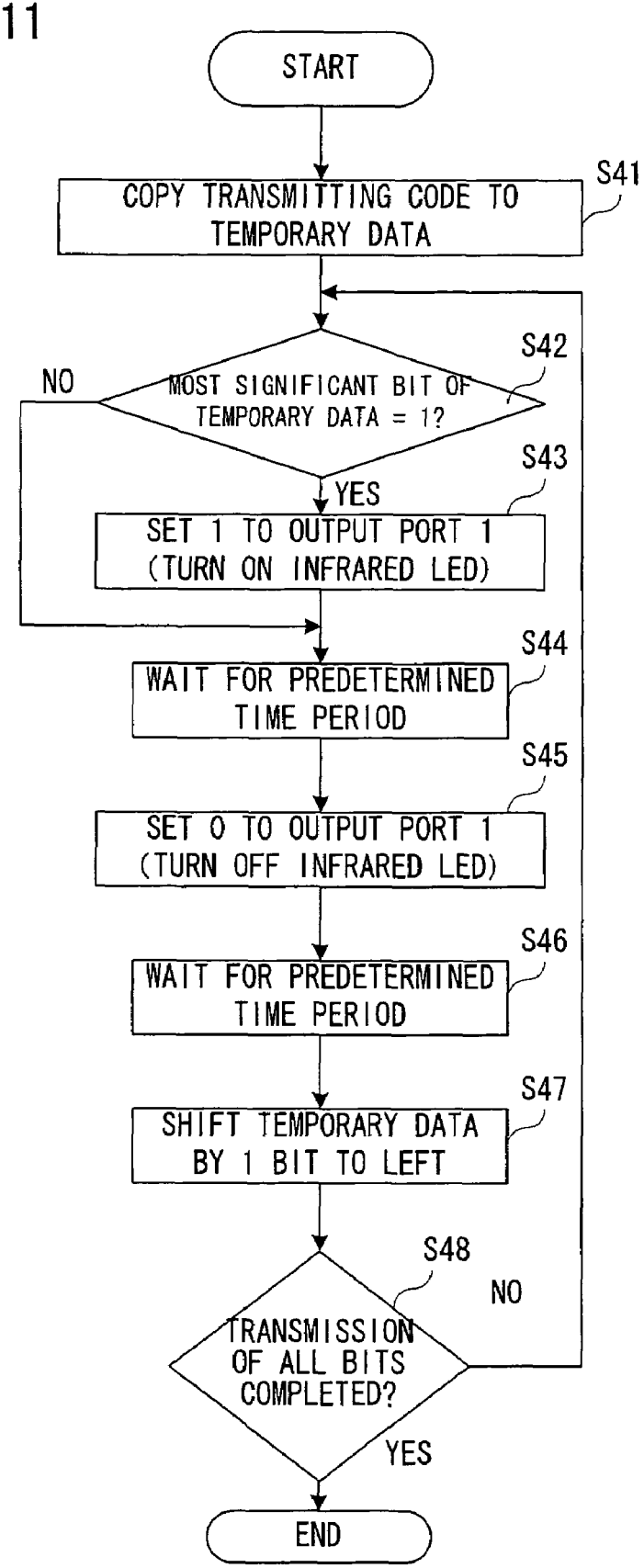
FIG. 11 is a flowchart showing a specific operation of a code transmitting process in a FIG. 9 embodiment.

Herein, referring to FIG. 11, a description will be made regarding the code transmission from the glove-type inputting apparatus 34 to the game processor 64 in the step S17 (FIG. 9). In a first step S41, the MCU 60 copies the transmission code created in the step S12 or step S16 to a temporary data register (not shown). Then, it is determined whether or not the most significant bit is "1". If the most significant bit is "1", "YES" is determined in a step S42, and in a succeeding step S43, the MCU 60 sets "1" to the output port 1, and turns on the infrared LED 62 (FIG. 3). Thereafter, a predetermined waiting time-period is elapsed in a step S44. However, if "NO" in the step S42, that is, if the most significant bit is "0", the process directly advances to the step S44.

After the predetermined waiting time-period is elapsed in the step S44, in a step S45, the MCU 60 sets "0" to the output port 1, and turns off the infrared LED 62. Thereafter, the predetermined waiting time-period is elapsed in a step S46.

After the predetermined waiting time-period is elapsed in the step S46, the MCU 60 makes a left shift by 1 bit, and renders the bit that has been a least significant bit in a step S47. That is, a transmission bit is exchanged for a bit serial transmission. Then, in a step S48, it is determined whether or not the transmission of all bits is completed. If "NO", the process returns to the step S42, and if "YES", the process is ended, and then, advances to the step S18 shown in FIG. 9.

Figure 12:
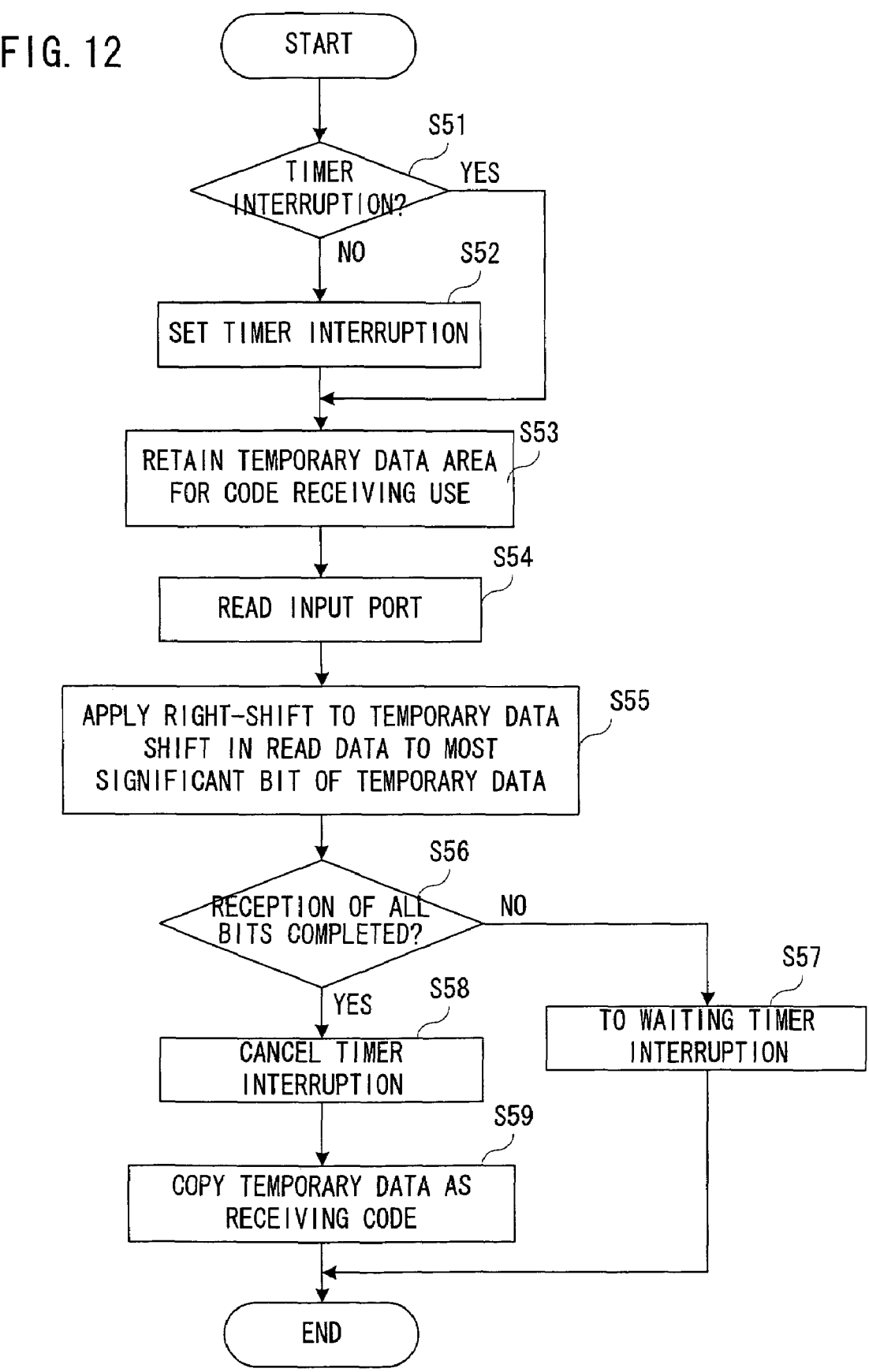
FIG. 12 is a flowchart showing a specific operation of a code receiving process by a game processor in a FIG. 7 embodiment.

Herein, referring to FIG. 12, a description will be made regarding a code receiving process by the game processor 64 shown in the step S9 in FIG. 7. In the code receiving process, for the process to be processed by a timer interruption, the game processor 64 determines whether or not there is a timer interruption in a first step S51. Unless the timer interruption, this is an interruption started by a transmission start bit. If "NO", the timer interruption is set in a step S52, and if "YES", the process directly advances to a step S53.

In the step S53, the game processor 64 retains a code receiving-use temporary data area within the internal memory 66 (FIG. 3). Then, in a succeeding step S54, data of the input port having the output signal being input from the infrared light-receiving portion 32 is read. In a succeeding step S55, the game processor 64 applies a right shift to the temporary data, and renders the data read in the step S54 the least significant bit of the temporary data.

Thereafter, it is determined whether or not it is completed to receive all bits in a step S56, and if "NO", a next time interruption is waited in a step S57. If "YES", the timer interruption is cancelled in a step S58, and in a step S59, the temporary data is copied as the receiving code. The game processor 64 uses this receiving code so as to execute the game process in FIG. 7.

As shown in preceding FIG. 7, after selecting the game mode in the step S3, the game processor 64 executes a "during the fight" process in the next step S4. More specifically, this during-the-fight process is executed according to a flowchart shown in FIG. 13 and FIG. 14.

In a first step S61 of the during-the-fight process, the game process 64 checks a state of the player's boxer so as to determine the state in the step S62. If this state is a "neutral", the process executes a player's boxer behavior determining process in a step S63.

Figure 15:
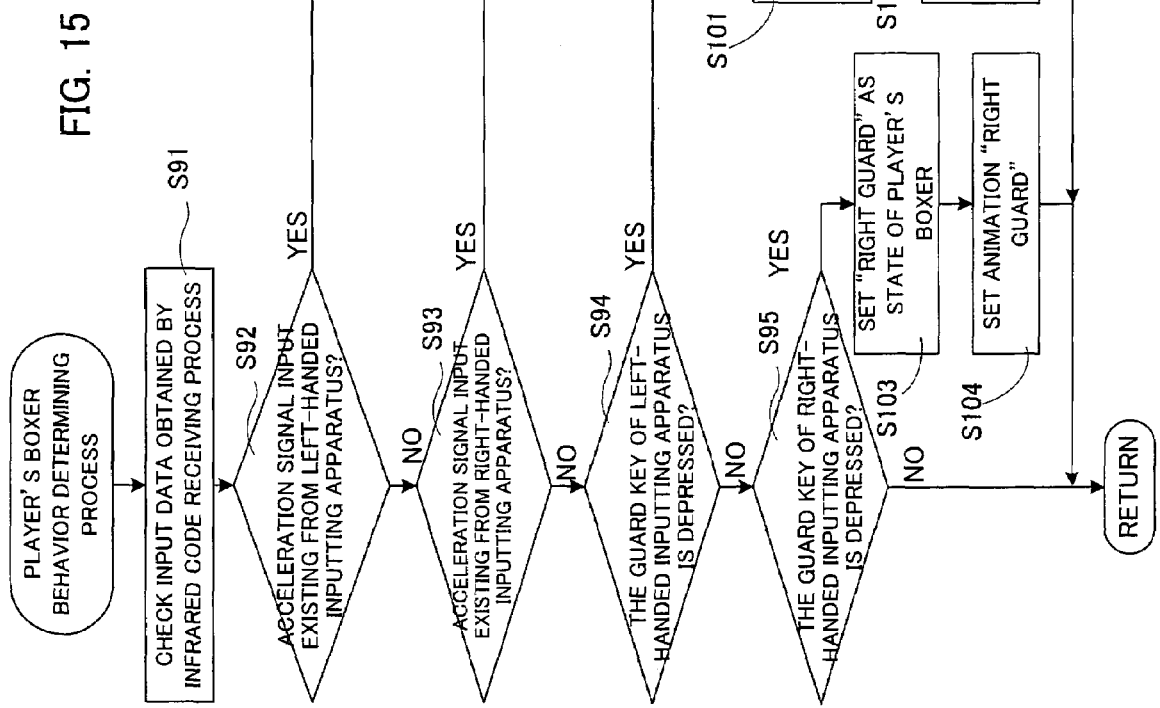
FIG. 15 is a flowchart showing a specific operation of a player's boxer behavior determining process by the game processor in a FIG. 14 embodiment.

Herein, referring to FIG. 15, a detailed description will be made regarding a subroutine in this step S63. In a first step S91 in FIG. 15, the game processor 64 checks the input data from the glove-type inputting apparatus 34 obtained as a result of the receiving process in FIG. 12 so as to determine whether or not there is the acceleration signal input from the left-handed inputting apparatus 34L in a step S92, whether or not there is the acceleration signal input from the right-handed inputting apparatus 34R in a step S93, whether or not the guard key 44 of the left-handed inputting apparatus 34L is depressed in a step S94, and whether or not the guard key 44 of the right-handed inputting apparatus 34R in a step S95, respectively.

If "YES" is determined in the step S92, that is, if the acceleration signal is input from the left-handed inputting apparatus 34L, the game processor 64 sets a "left punch" as the state of the player's boxer in a succeeding step S96, and sets the "left punch" as an animation of the player's boxer to be displayed on the game screen 45 at that time.

If "YES" is determined in the step S93, that is, if the acceleration signal is input from the right-handed inputting apparatus 34R, the game processor 64 sets a "right punch" as the state of the player's boxer in a succeeding step S98, and sets the "right punch" as an animation of the player's boxer to be displayed on the game screen 45 at that time.

After the step S97 or S99, that is, after the "left punch" or the "right punch" is set, the game processor 64 determines an "intensity of the punch" of the left punch or the right punch from a magnitude of the acceleration at that time in a step S100. In this step S100, more specifically, the game processor 64 calculates from the magnitude of the acceleration the intensity of the punch according to the predetermined coefficient for the conversion.

If "YES" is determined in the step S94, that is, if the guard key 44 of the left-handed inputting apparatus 34L is turned on, the game processor 64 sets a "left guard" as the state of the player's boxer in a succeeding step S101, and sets a "left guard" as the animation of the player's boxer to be displayed at that time on the game screen 45 in a step S102.

Then, if "YES" is determined in the step S95, that is, if an on signal of the guard key 44 is input from the right-handed inputting apparatus 34R, the game processor 64 sets the "right guard" as the state of the player's boxer in a succeeding step S103, and sets the "right guard" as the animation of the player's boxer to be displayed at that time on the game screen 45.

Thus, in the player's boxer behavior determining process in the step S63, according to the input signal (information) from the input apparatus 34, only the state (in a case of the punch, the intensity is included) of the player's boxer (boxer of the game player), and the setting of the animation are performed.

Figure 13:
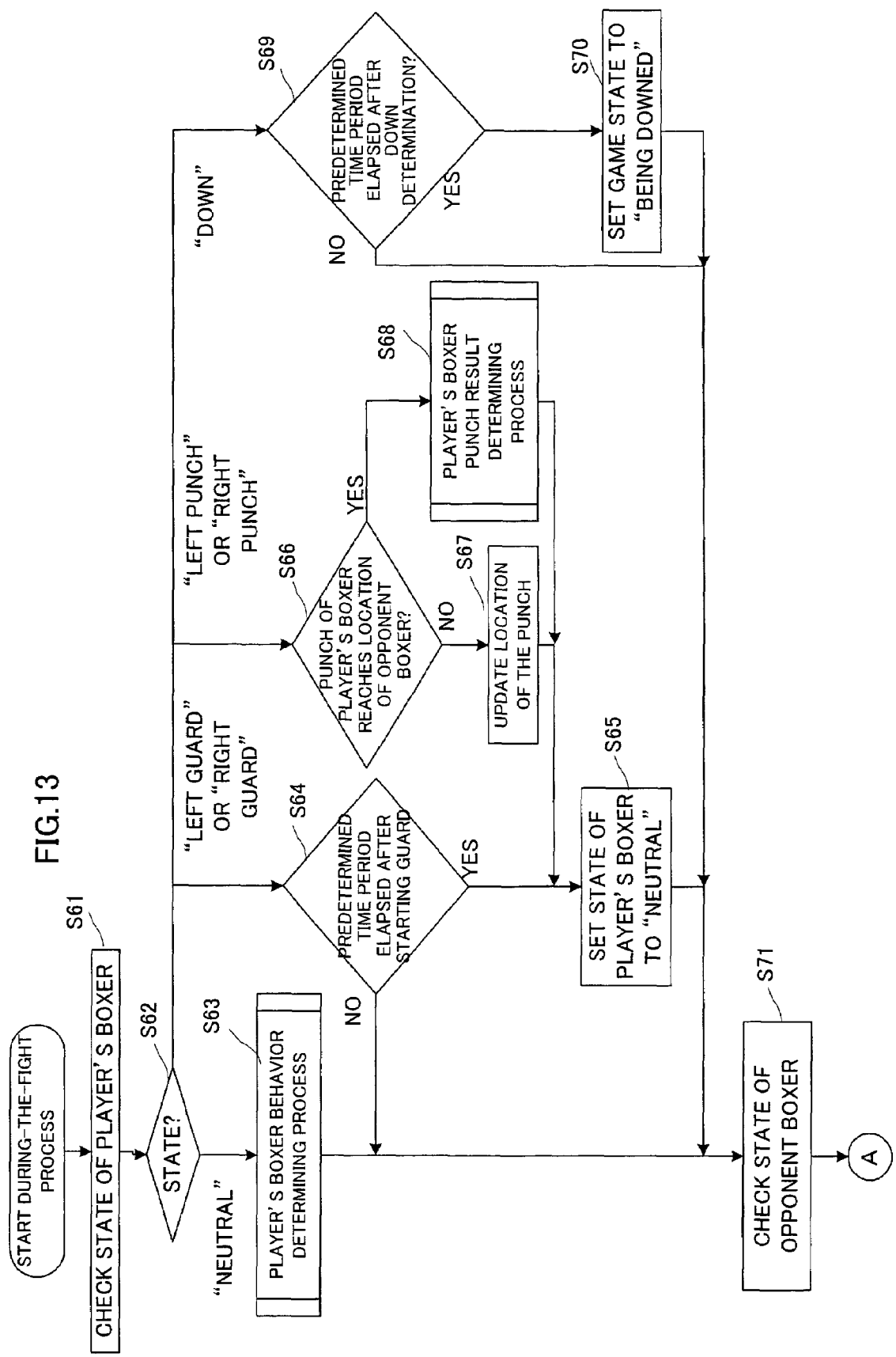
FIG. 13 is a flowchart showing one portion of a specific operation of a during-the-fight process in the FIG. 7 embodiment.

Referring to FIG. 13, when it is determined that the state of the player's boxer is the "left guard" or the "right guard" in the step S62, the game processor 64 determines whether or not the predetermined time period is elapsed after starting the guard in a succeeding step S64. If "NO", the process advances to a step S71, and if "YES", the state of the player's boxer is set to the "neutral" in a step S65. That is, in a case that the predetermined time period is elapsed after the guard key 44 is depressed, the state of the player's boxer is returned to the "neutral".

If it is determined that the state of the player's boxer is the "left punch" or the "right punch" in the step S62, the game processor 64 determines whether or not the punch of the player's boxer reaches a location of the opponent boxer in a next step S66. If "NO", the location of the punch is updated in a step S67, and if "YES", a result determining process of the punch of the player's boxer is executed in the step S68.

Figure 16:
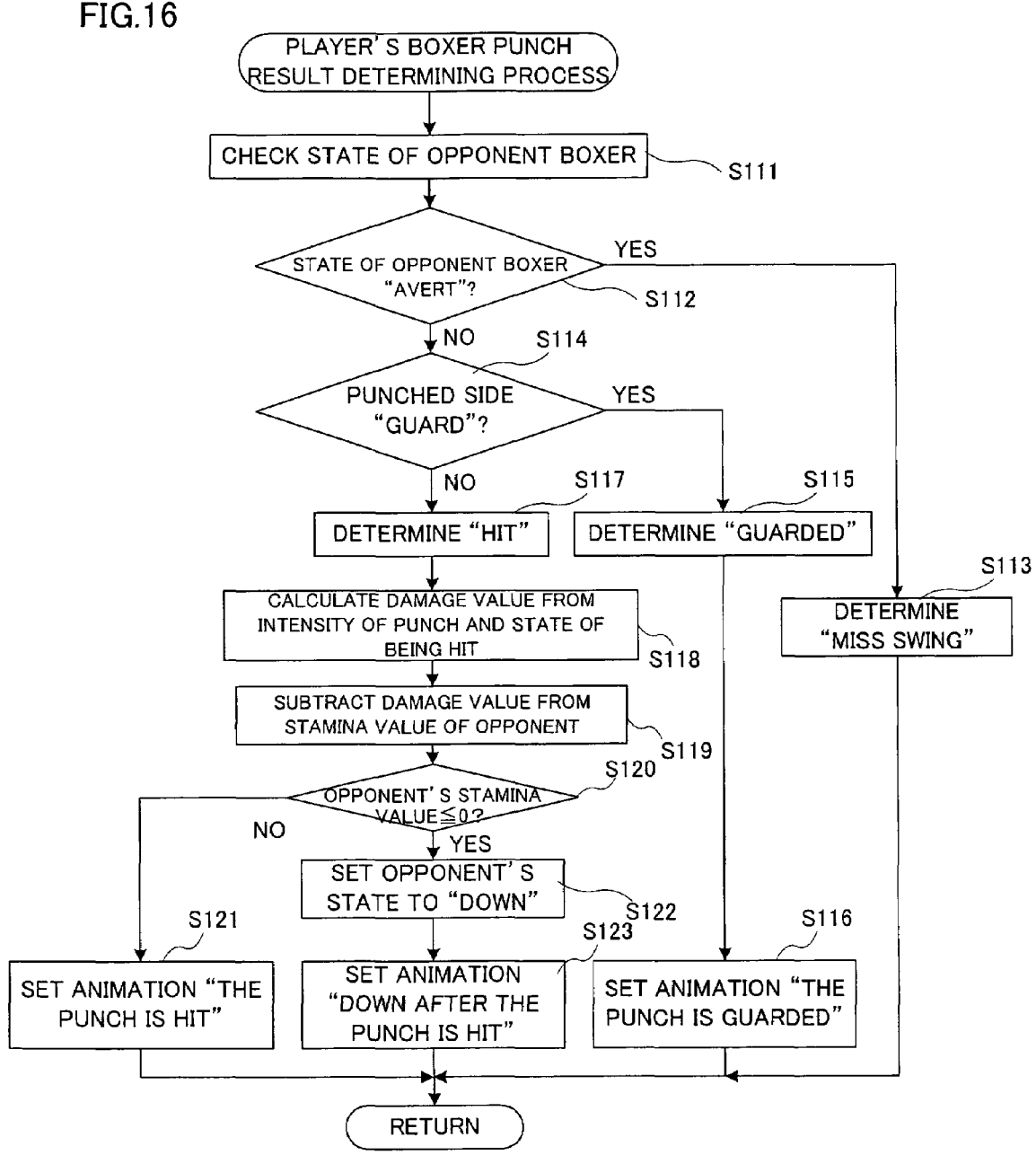
FIG. 16 is a flowchart showing one portion of the specific operation of the player' boxer behavior determining process by the game processor in the FIG. 14 embodiment.

The detailed process shown in this step S68 is shown in a subroutine in FIG. 16. In a first step S111, the game processor 64 checks the state of the opponent boxer, and in a step S112, it is determined whether or not the state of the opponent boxer is an "avert". If "YES" is determined, in a succeeding step S113, the game processor 64 determines that the result of the punch of the player's boxer is a "miss swing".

If "NO" in the step S112, it is determined whether or not the state of the opponent boxer is the "guard" in a next step S114. That is, it is determined whether or not the opponent boxer performs the left guard (right from a player's side) if the player's boxer throws the right punch, or whether or not the opponent boxer performs the right guard (left from a player's side) if the player's boxer throws the left punch. If "YES" is determined in this step S114, the game processor 64 determines that the result of the punch of the player's boxer is the "guarded" in a step S115, and sets to "the punch is guarded" the animation of the opponent boxer to be displayed on the game screen 45 (FIG. 2) in a succeeding step S116.

If "NO" is determined in the step S114, in a next step S117, the game processor 64 determines that the result of the punch of the player's boxer is "hit". Then, in a next step S118, the game processor 64 calculates a damage of the opponent boxer from the intensity of the punch (step S100 in FIG. 15) and the state at a time of being hit. Then, the calculated damage value is subtracted from the stamina value of the opponent boxer (step S119).

In a step S120, the game processor 64 determines whether or not the stamina value of the opponent boxer having the damage value by the punch of the player's boxer subtracted is rendered equal to or smaller than "0" (zero). In a case of determining "NO" in this step S120, that is, in a case that the stamina value that is equal to or more than 1 is remained as the stamina value of the opponent boxer, in a step S121, as the animation of the opponent boxer to be displayed on the game screen, "the punch is hit" is set. On the contrary, if the stamina value is run out, "YES" is determined in the step S120, and in this case, the game processor 64 sets the state of the opponent boxer to "down" in a next step S122. The animation of the opponent boxer is set to "down after the punch is hit" in a step S123.

Thus, when the punch of the player's boxer reaches the opponent boxer, as a result of the punch, it is determined what has become of the opponent boxer in the step S68.

Returning to FIG. 13 once again, after the location of the punch is updated in the step S67, or after the result of the punch of the player's boxer is processed in the step S68, the process advances to the succeeding step S65 so as to set the state of the player's boxer to "neutral".

When it is determined that the state of the player's boxer is "down" in the step S62, the game processor 64 determines whether or not the predetermined time period is elapsed after the down in a step S69. If "NO", the process advances to the step S71, and if "YES", the game state is set to "being downed" in a step S70.

After the step S63, the step S65, or the step S70, the process advances to the step S71. In the step S71, the game processor 64 checks the state of the opponent boxer. Thereafter, a similar operation to the case of determining the state of the player's boxer described before is performed. However, the state "avert" exists in the opponent boxer, in a case of the behavior determination of the player's boxer described before, no "avert" exists. Therefore, although "avert" exists in steps S73-S82, the process is basically similar to the preceding steps S62-S70.

Figure 14:
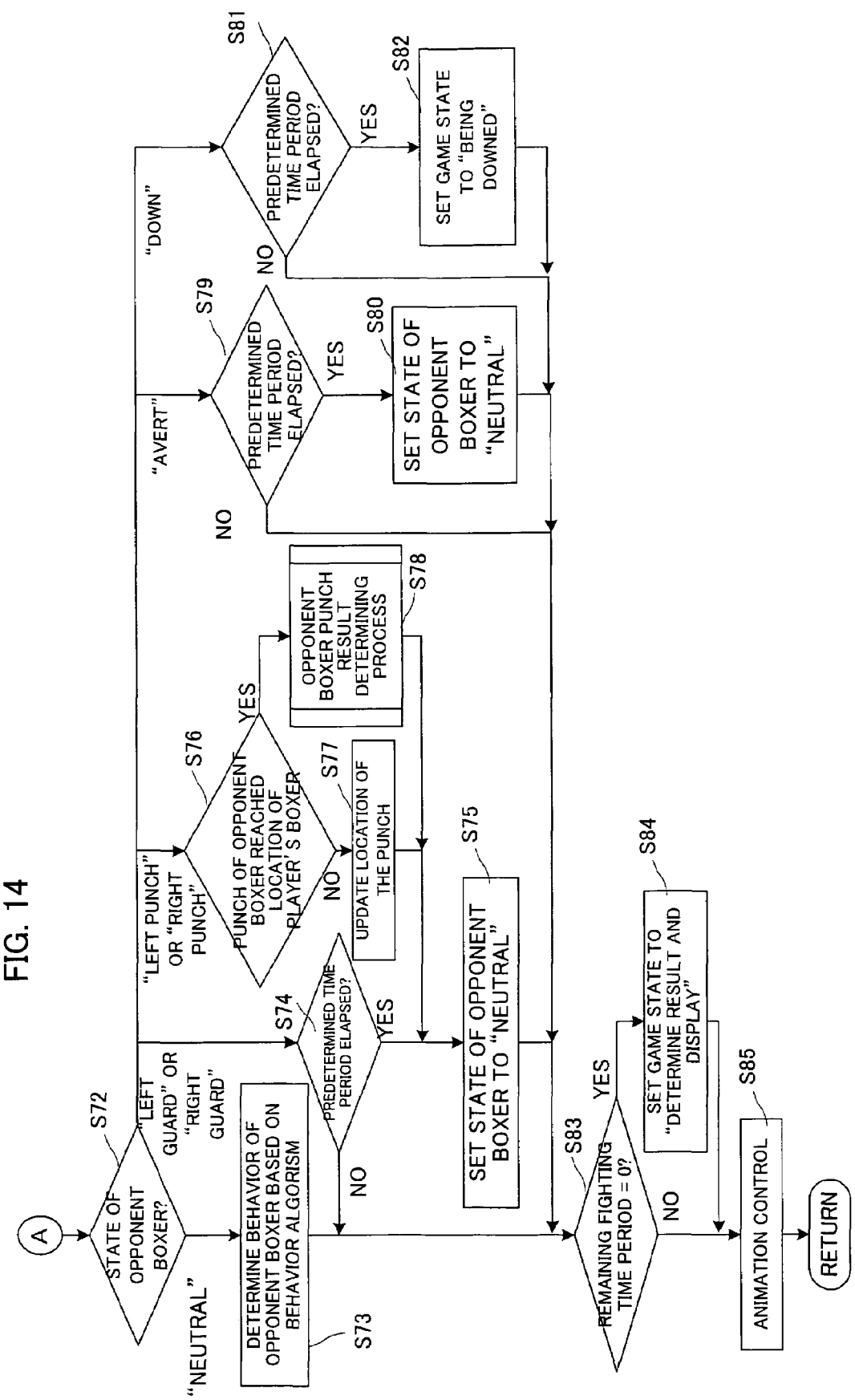
FIG. 14 is a flowchart showing a remaining portion of the specific operation of the during-the-fight process in the FIG. 7 embodiment.

In a first step S72 in FIG. 14, the game processor 64 determines the state of the opponent boxer. If this state is "neutral", in the step S73, based on the behavior algorism similar to the behavior determining process of the player's boxer shown in FIG. 15, an opponent-boxer behavior determining process is executed, for example.

Then, it is determined that the state of the opponent boxer is "left guard" or "right guard" in the step S72, the game processor 64 determines whether or not the predetermined time period is elapsed after starting the guard in a next step S74. If "NO", the process advances to the step S83, and if "YES", the state of the opponent boxer is set to "neutral" in the step S75.

If it is determined that the state of the opponent boxer is "left punch" or "right punch" in the step S72, the game processor 64 determines whether or not the punch of the opponent boxer reaches the location of the player's boxer in a next step S76. If "NO", the location of the punch of the opponent boxer is updated in the step S77, and if "YES", the result determining process of the punch of the opponent boxer is executed in the step S78.

A detailed description shown in this step S78 is displayed in a subroutine in FIG. 17. In a first step S131, the game processor 64 checks the state of the player's boxer, and determines whether or not the state of the player's boxer is "guard" in a step S132. That is, it is determined whether or not the player's boxer performs the right guard if the opponent boxer throws the left punch (right from a player's side), or whether or not the player's boxer performs the left guard if the opponent boxer throws the right punch (right from a player's side). If "YES" is determined in this step S132, the game processor 64 determines that the result of the punch of the opponent boxer is "guarded" in a step S133, and in succeeding step S134, sets the animation of the player's boxer to be displayed on the game screen 45 (FIG. 2) to "the punch is guarded".

If "NO" is determined in the step S132, in a next step S135, the game processor 64 determines that the result of the punch of the opponent boxer is "hit". Then, in a next step S136, the game processor 64 calculates the damage of the player's boxer from the intensity of the punch (S100 in FIG. 15) and the state at a time of being hit. Then, in a step S137, the calculated damage value is subtracted from the stamina value of the player's boxer.

In a step S138, the game processor 64 determines whether or not the stamina value of the player's boxer that subtracts the damage value by the punch of the opponent boxer is rendered equal to or smaller than "0" (zero). If "NO" is determined in the step S138, that is, in a case that the stamina value of the player's boxer that is equal to or larger than 1 is remained, in a step S139, as the animation of the player's boxer displayed on the game screen, "punch is hit" is set. On the contrary, when the stamina value of the player's boxer is run out, in the step S138, "YES" is determined. In this case, the game processor 64 sets the state of the player's boxer to "down" in a next step S140, and sets the animation of the player's boxer to "down after the punch is hit" in a step S141.

Returning to FIG. 14, after updating the location of the punch in the step S77, or after the result of the punch of the opponent boxer is processed in the step S78, the process advances to the succeeding step S75 so as to set the state of the opponent boxer to "neutral".

In a case of determining that the state of the opponent boxer is "avert" in the step S72, the game processor 64 determines whether or not the predetermined time period is elapsed from starting averting in a next step S79. If "NO", the process advances to the step S83. However, if "YES", the process sets the state of the opponent boxer to "neutral" in the step S80.

Then, in addition, when it is determined that the state of the opponent boxer is "down" in the step S72, the game processor 64 determines whether or not the predetermined time period is elapse after being downed in the step S81. If "NO", the process advances to the step S83, and if "YES", the process sets the game state to "during being downed" in the step S82, and thereafter, advances to the step S83. In the step S83, the game processor 64 determines whether or not the remaining time period is 0 (zero), and if "YES", the game state is set to "determine result and display" in a step S84. However, if "NO", an animation control for a game screen display is executed in the step S85.

It is noted that in the above embodiment, the voltage signal is extracted as the acceleration correlated signal generated in the piezoelectric buzzer element. However, the signal may be extracted as a current signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A boxing game system, comprising:
   an inputting apparatus swung in a real space, which is held by a hand of a game player, or attached to the hand of the game player, including an acceleration sensor for detecting a magnitude of a swing of said inputting apparatus, a guard key provided so as to be operable by the hand of said game player, and a wireless transmitter for transmitting in a wireless manner acceleration information detected by said acceleration sensor and a state of said guard key;
   a wireless receiver for receiving the acceleration information transmitted by said wireless transmitter; and
   a game processor for receiving the acceleration information received by said wireless receiver, wherein
   said game processor determines an intensity of a punch based on said acceleration information, and determines according to the state of said guard key whether or not a boxer of said game player makes a guard operation.

2. A boxing game system according to claim 1, wherein said inputting apparatus includes a boxing glove made of a cushion member, and a wristband provided to be integrated with said boxing glove, and attached to a wrist of said game player.

3. A boxing game system according to claim 1, wherein two of the inputting apparatuses are used for both hands of the game player, and the game processor determines that the game player makes the guard operation when a punch of an opponent is received and the guard key is operated by the game player.

4. A boxing game system according to claim 1, wherein the inputting apparatus includes a body capable of being grasped by the hand of the game player, the acceleration sensor and the wireless transmitter are incorporated within the body, and the guard key is provided on the body.

5. A boxing game apparatus according to claim 1, wherein the guard key performs a function of a decision key.

6. A boxing game apparatus according to claim 1, wherein the game processor displays a game screen on a monitor, and a boxer of said game player is displayed on said game screen as a glove image.

* * * * *